US012580929B2

(12) United States Patent
Korn et al.

(10) Patent No.: US 12,580,929 B2
(45) Date of Patent: Mar. 17, 2026

(54) TECHNIQUES FOR ASSESSING MALWARE CLASSIFICATION

(71) Applicant: CrowdStrike, Inc., Sunnyvale, CA (US)

(72) Inventors: Arnd Korn, Berlin (DE); Calin-Bogdan Miron, Nottingham (GB); Marian Radu, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 190 days.

(21) Appl. No.: 18/358,720

(22) Filed: Jul. 25, 2023

(65) Prior Publication Data

US 2025/0039194 A1 Jan. 30, 2025

(51) Int. Cl.
*H04L 9/40* (2022.01)
*G06N 20/00* (2019.01)
(52) U.S. Cl.
CPC ......... *H04L 63/1416* (2013.01); *G06N 20/00* (2019.01)
(58) Field of Classification Search
CPC ..... H04L 63/1416; H04L 41/16; G06N 20/00; G06F 16/2228; G06F 16/953; G06F 21/563; G06F 16/901; G06F 16/152; G06F 7/023; H04N 21/251; H04N 21/466; H04N 21/45; H04N 21/4662
See application file for complete search history.

(56) References Cited

U.S. PATENT DOCUMENTS

| | | | | |
|---|---|---|---|---|
| 11,227,047 | B1* | 1/2022 | Vashisht | G06F 21/56 |
| 11,366,842 | B1* | 6/2022 | Swaminathan | G06F 16/2477 |
| 11,714,698 | B1* | 8/2023 | Curtis | G06F 18/214 |
| | | | | 714/48 |
| 11,960,545 | B1* | 4/2024 | Sabhanatarajan | |
| | | | | G06F 16/90335 |
| 12,050,993 | B2* | 7/2024 | Lee | G06F 16/285 |
| 12,135,949 | B1* | 11/2024 | Cameron | G06F 40/40 |
| 12,284,097 | B1* | 4/2025 | Zelenin | H04L 41/145 |
| 12,288,014 | B1* | 4/2025 | Romero | G06N 20/20 |
| 2012/0197896 | A1* | 8/2012 | Li | G06F 16/313 |
| | | | | 707/E17.089 |
| 2017/0279828 | A1* | 9/2017 | Savalle | H04L 63/1416 |
| 2022/0034753 | A1* | 2/2022 | Liebman | F02D 13/0203 |
| 2022/0108213 | A1* | 4/2022 | Cao | G06F 18/214 |
| 2022/0180242 | A1* | 6/2022 | Lee | G06N 3/047 |
| 2022/0321397 | A1* | 10/2022 | Tormasov | H04L 63/1416 |
| 2024/0205256 | A1* | 6/2024 | Tormasov | H04L 63/1425 |
| 2024/0311479 | A1* | 9/2024 | Yan | G06F 21/52 |

* cited by examiner

*Primary Examiner* — Michael Won
(74) *Attorney, Agent, or Firm* — Womble Bond Dickinson (US) LLP

(57) ABSTRACT

A sample file that is associated with malware and a first modification model of a plurality of modification models to alter the sample file are selected. The first modification model generates a modification configuration based on the sample file. The modification configuration identifies a modification to be performed on the sample file. The sample file and the modification configuration are provided to a modification engine to generate a modified sample file. The modification configuration is adjusted based on the first modification model in response to receiving a classification from a classification model that identifies the modified sample file as being free of malware.

20 Claims, 9 Drawing Sheets

196A

SELECT SUBSET OF KNOWN ATTACKS AND GENERATE ATTACK CONFIGURATION ⟋ 502

MODIFY SAMPLE FILE USING ONE OF THE SUBSET OF ATTACKS ⟋ 504

RECEIVE CLASSIFICATION RESULT ⟋ 506

508
ATTACK EVADES CLASSIFICATION?

Y

510
ADD ATTACK TO EVADED SAMPLES

N

512
ATTACK COMPLETE?

N

Y

GENERATE ASSESSMENT BASED ON EVADED SAMPLES ⟋ 514

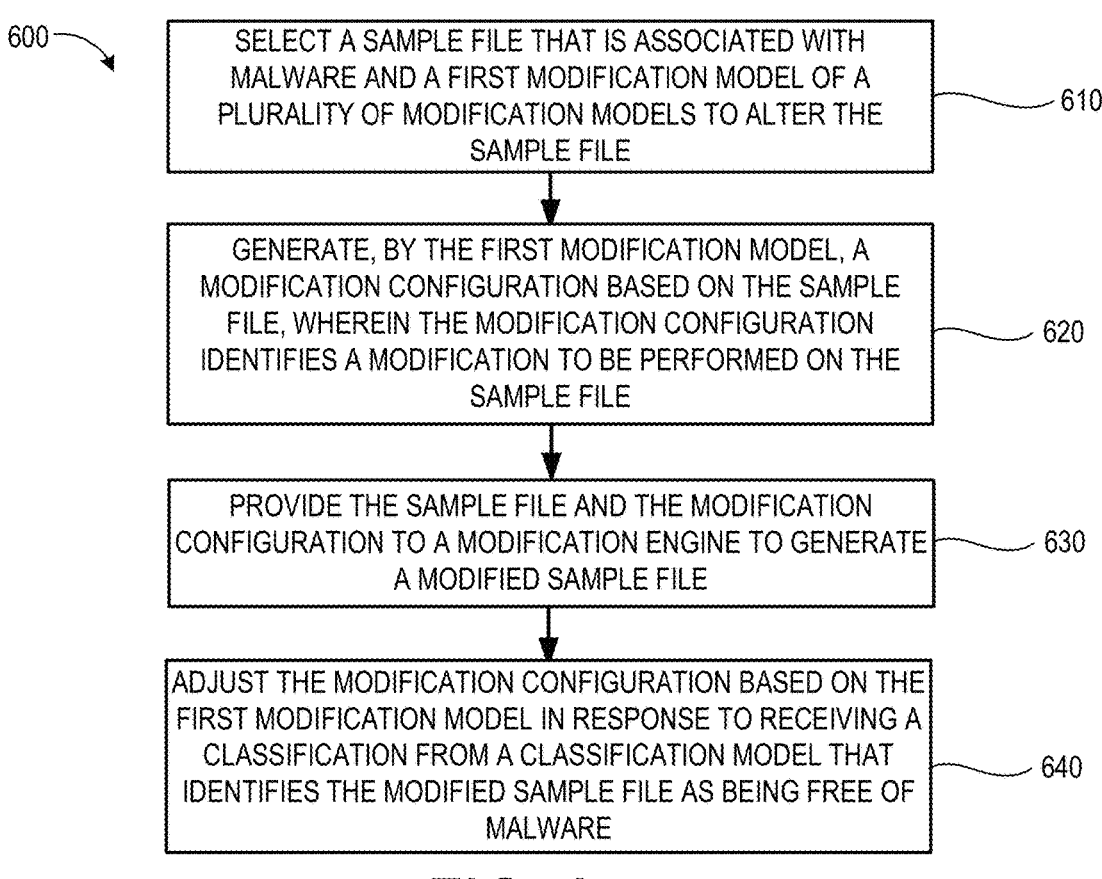

600

610 — SELECT A SAMPLE FILE THAT IS ASSOCIATED WITH MALWARE AND A FIRST MODIFICATION MODEL OF A PLURALITY OF MODIFICATION MODELS TO ALTER THE SAMPLE FILE

620 — GENERATE, BY THE FIRST MODIFICATION MODEL, A MODIFICATION CONFIGURATION BASED ON THE SAMPLE FILE, WHEREIN THE MODIFICATION CONFIGURATION IDENTIFIES A MODIFICATION TO BE PERFORMED ON THE SAMPLE FILE

630 — PROVIDE THE SAMPLE FILE AND THE MODIFICATION CONFIGURATION TO A MODIFICATION ENGINE TO GENERATE A MODIFIED SAMPLE FILE

640 — ADJUST THE MODIFICATION CONFIGURATION BASED ON THE FIRST MODIFICATION MODEL IN RESPONSE TO RECEIVING A CLASSIFICATION FROM A CLASSIFICATION MODEL THAT IDENTIFIES THE MODIFIED SAMPLE FILE AS BEING FREE OF MALWARE

FIG. 6

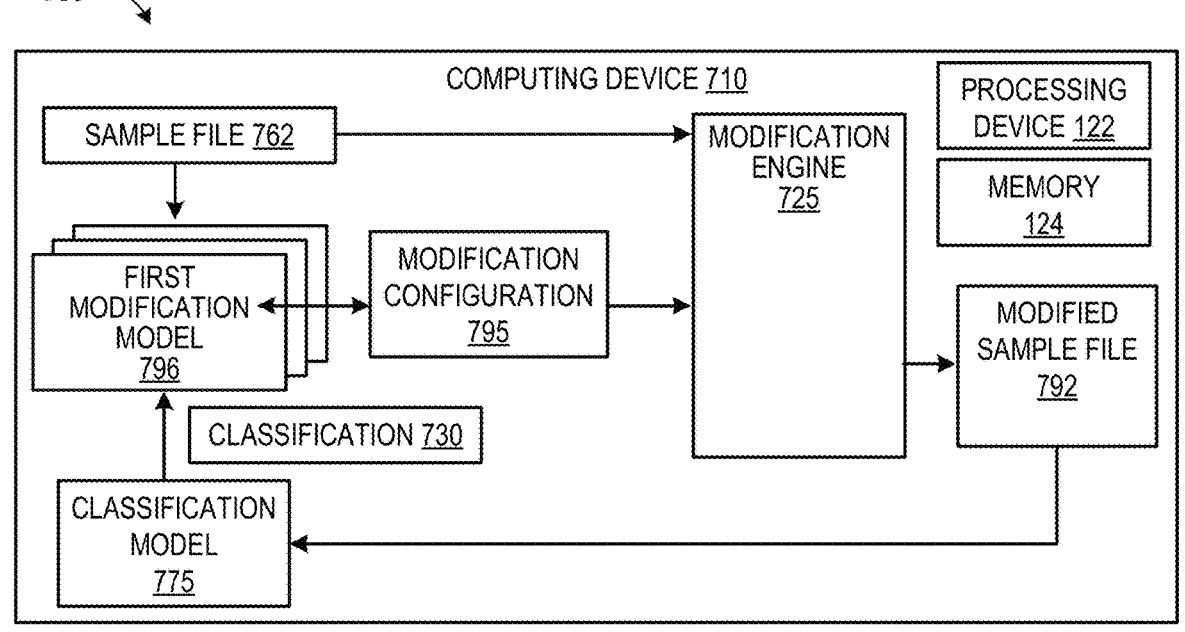

700

COMPUTING DEVICE 710

SAMPLE FILE 762

FIRST MODIFICATION MODEL 796

MODIFICATION CONFIGURATION 795

MODIFICATION ENGINE 725

PROCESSING DEVICE 122

MEMORY 124

MODIFIED SAMPLE FILE 792

CLASSIFICATION 730

CLASSIFICATION MODEL 775

FIG. 7

TECHNIQUES FOR ASSESSING MALWARE CLASSIFICATION

TECHNICAL FIELD

Aspects of the present disclosure relate to detecting malicious executables, and more particularly, to assessing machine learning models that perform malware detection.

BACKGROUND

Malware is a term that refers to malicious software. Malware includes software that is designed with malicious intent to cause intentional harm and/or bypass security measures. Malware is used, for example, by cyber attackers to disrupt computer operations, to access and to steal sensitive information stored on the computer or provided to the computer by a user, or to perform other actions that are harmful to the computer and/or to the user of the computer. Malware may be formatted as executable files (e.g., EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware-detection or -removal tools.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

FIG. 6 is a flow diagram of a method for operating a malware detection system, according to some embodiments of the present disclosure.

FIG. 7 is a component diagram of an example of a device architecture for malware detection, in accordance with embodiments of the disclosure

DETAILED DESCRIPTION

Figure 1:
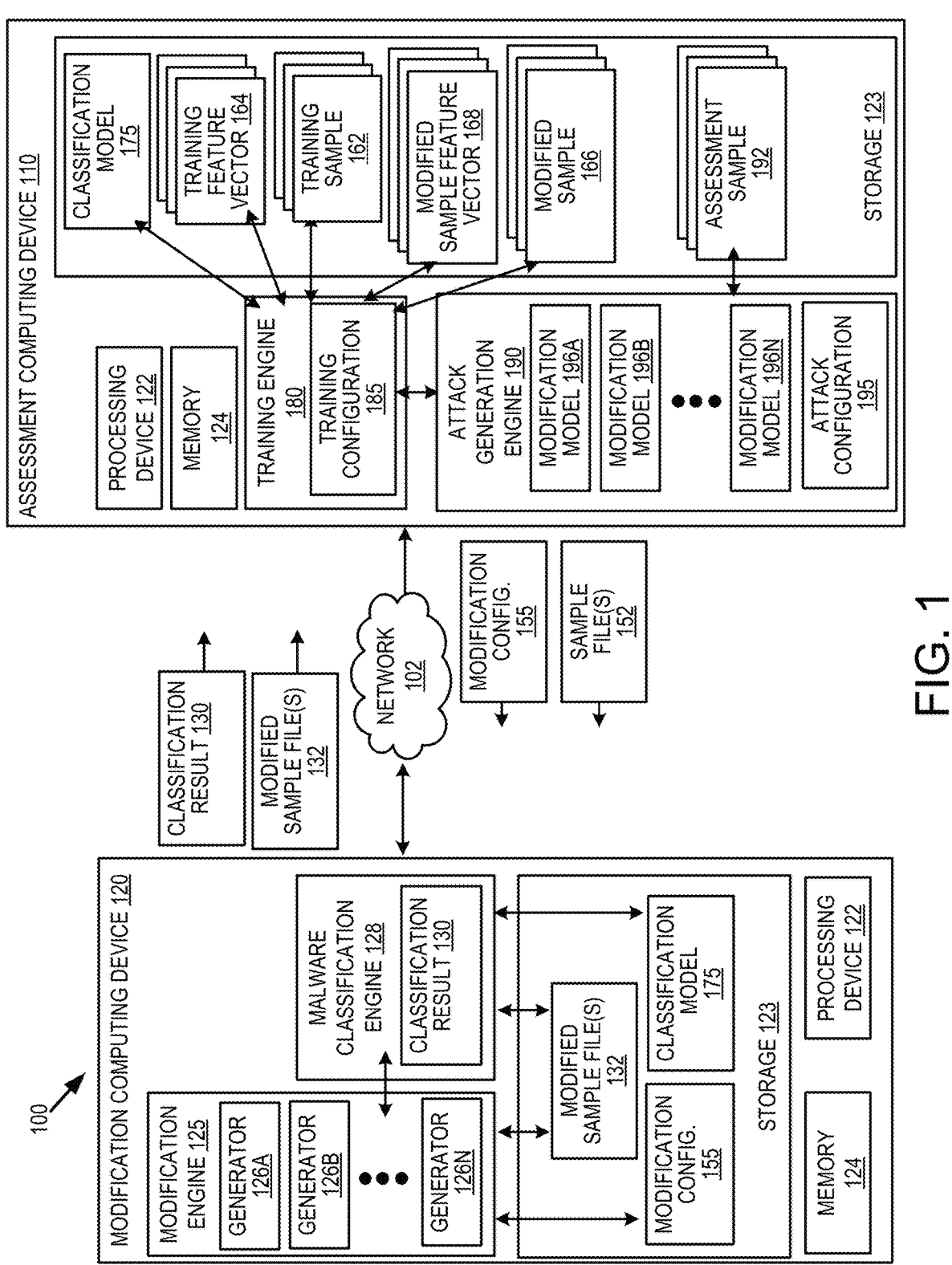
FIG. 1 is a block diagram that illustrates an example system, according to some embodiments of the present disclosure.

Modern computer systems are subject to a large number of potential malicious software (referred to herein as "malware") attacks. Examples of malware include computer viruses, worms, Trojan horses, ransomware, rootkits, keyloggers, spyware, adware, rogue security software, potentially unwanted programs (PUPs), potentially unwanted applications (PUAs), and other malicious programs. To protect from such malware, users may install scanning programs which attempt to detect the presence of malware. These scanning programs may review programs and/or executables that exist on the computer's storage medium (e.g., a hard disk drive (HDD)) prior to execution of the file. However, authors and distributors of malware have taken countermeasures to avoid these scanning programs. In some cases, the malware is obfuscated to conceal the contents of the file. Obfuscation may include varying the contents of the file to misdirect, confuse, or otherwise conceal the true purpose and/or function of the code. For example, obfuscation may include inserting inoperable code within the executable instructions, compressing/encrypting the operating instructions, rearranging the code instructions, and/or other techniques. These techniques can make it difficult to identify malware in at-rest files.

Malware detection engines may utilize machine learning (ML) models to detect malware. By processing large numbers of files for which the malware status is known, an ML model may be developed that can identify malware from a given sample based on its similarity with one or more of the files upon which the ML model was trained. For example, a malware classification ML model may be developed that can generate a probability that a particular file is associated with malware after being trained. However, classification models to predict scores for malicious or unwanted files or processes are subject to adversarial attempts at evasion of detection through obfuscation and other techniques. The robustness of a classification model against such adversarial attacks is a desired characteristic and an important consideration in assessing the performance and fit for purpose of the classification model. Evolving characteristics of files or processes associated with malware and of adversarial attack techniques result in an open problem for ongoing and iterative re-training, improvement, and re-assessment of predictive performance and adversarial robustness of the classification model, for example on new or evolving malware families.

The present disclosure addresses the above-noted and other deficiencies by providing an automated solution that generates an assessment of a malware classification model and identifies additional samples that may be provided for training the classification model to increase its capability for malware detection. By proactively testing malware variations against a particular classification model, vulnerabilities in the classification model may be identified and reinforced during subsequent ML training. After detecting the types of malware variations that are least likely to be detected by a given ML model, additional samples of files having those types of malware variations may be provided during ML training to increase a probability that the malware may be detected in the future.

In some embodiments, a common interface for adversarial attacks may be utilized that allows for the automated generation of file variations. For example, machine learning techniques may be utilized to identify particular attacks against a classification model, and the common interface may be utilized to generate modified samples consistent with those attacks. The machine learning techniques may provide the modified samples to the classification model and learn from the classifications generated by the classification model in response to those modified samples to generate further attacks (and associated modified samples). Modified samples that are successful in generating a false negative result (e.g., a prediction that a sample is malware-free when it actually contains malware) from a classification model may be included in further training of the classification to improve its robustness.

In some embodiments, the modified samples may be provided in accordance with one or more modification models. The modification models may themselves be based on machine learning, and may generate different modified samples based on an attack policy that is updated by the one or more modification models to select modifications that have an increased likelihood of evading detection by the classification model. Some examples of the modification models include heuristic learning techniques, reinforcement learning techniques, and genetic programming techniques, to name just a few examples. In some embodiments, the selection of the modification model may be based on the type of sample being modified. By using a common modification interface, different modifications may be generated quickly for a given sample in a way that allows the modification model to more rapidly zero in on weaknesses in the classification model.

The embodiments described herein provide improvements over some security mechanisms which rely on the detection of particular patterns in stored files. In sharp contrast to conventional systems, the modification model and associated systems described herein may be capable of identifying classification models that are vulnerable to sample modification. By detecting modifications that evade detection by a classification model, those modifications can be incorporated into samples that may be provided to the classification model for further training. Exposing the classification model to the modified samples in training may allow for similar types of modifications to be recognized in the future, which may increase a level of security of a device incorporating such a classification model as part of its malware detection. By increasing the capability of the classification model to detect malware, embodiments of the present disclosure improve the operation of a computer operating such a classification model, since malware may be more accurately detected, and a loss in resources and/or operating capability due to the malware may be averted.

FIG. 1 is a block diagram that illustrates an example system 100, according to some embodiments of the present disclosure. FIG. 1 and the other figures may use like reference numerals to identify like elements. A letter after a reference numeral, such as "196A," indicates that the text refers specifically to the element having that particular reference numeral. A reference numeral in the text without a following letter, such as "196," refers to all of the elements in the figures bearing that reference numeral.

As illustrated in FIG. 1, the system 100 includes a first computing device 110 (also referred to herein as an assessment computing device 110) and a second computing device 120 (also referred to herein as a modification computing device 120). The assessment computing device 110 and the modification computing device 120 may each include hardware such as processing device 122 (e.g., processors, central processing units (CPUs)), memory 124 (e.g., random access memory (RAM), storage devices 123 (e.g., hard-disk drive (HDD)), and solid-state drives (SSD), etc.), and other hardware devices (e.g., sound card, video card, etc.).

In some embodiments, memory 124 may be volatile memory that loses contents when the power to the computing device is removed or non-volatile memory that retains its contents when power is removed. In some embodiments, memory 124 may be non-uniform access (NUMA), such that memory access time depends on the memory location relative to processing device 122.

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like. It should be noted that although, for simplicity, a single processing device 122 is depicted in the modification computing device 120 and the assessment computing device 110 depicted in FIG. 1, other embodiments of the modification computing device 120 and/or the assessment computing device 110 may include multiple processing devices 122, storage devices 123, or other devices.

The storage device 123 may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The assessment computing device 110 and/or the modification computing device 120 may comprise any suitable type of computing device or machine that has a programmable processor including, for example, server computers, desktop computers, laptop computers, tablet computers, smartphones, set-top boxes, etc. In some examples, the modification computing device 120 and/or the assessment computing device 110 may comprise a single machine or may include multiple interconnected machines (e.g., multiple servers configured in a cluster). The assessment computing device 110 and/or the modification computing device 120 may be implemented by a common entity/organization or may be implemented by different entities/organizations.

The assessment computing device 110 and the modification computing device 120 may be coupled to each other (e.g., may be operatively coupled, communicatively coupled, may communicate data/messages with each other) via network 102. Network 102 may be a public network (e.g., the internet), a private network (e.g., a local area network (LAN) or wide area network (WAN)), or a combination thereof. In one embodiment, network 102 may include a wired or a wireless infrastructure, which may be provided by one or more wireless communications systems, such as a WIFI™ hotspot connected with the network 102 and/or a wireless carrier system that can be implemented using various data processing equipment, communication towers (e.g., cell towers), etc. The network 102 may carry communications (e.g., data, message, packets, frames, etc.) between the assessment computing device 110 and the modification computing device 120.

The modification computing device 120 may be configured to provide a common interface for a modification engine 125 to modify a provided sample file 152 to generate one or more modified sample files 132. The modified sample file 132 may be provided to a malware classification engine 128 to generate a classification result 130. The modified sample file 132 and the classification result 130 may be provided to a caller of the common interface. An example of a common interface for generating modifications for sample files provided to a malware classification engine are described, for example, in U.S. patent application Ser. No. 18/125,635, entitled "ADVERSARIAL ATTACKS COM-MON INTERFACE" and filed on Mar. 23, 2023, the entire contents of which are incorporated by reference herein.

For example, the modification engine 125 may receive a request to process a sample file 152. In some embodiments, the request may include a modification configuration 155. The modification configuration 155 may include metadata indicative of one or more attacks, and attack rules for applying the attacks, to the sample file 152. The modification engine 125 may modify, based on the modification configuration 155, the sample file 152 (or a copy of the sample file 152) to generate the modified sample file 132.

The modification engine 125 may provide the modified sample file 132 to the malware classification engine 128 to cause the malware classification engine 128 to generate a classification result 130 indicating whether the modified sample file 132 is associated with malware. The classification result 130 may be generated by the malware classification engine 128 by providing the modified sample file 132 to a classification model 175, which may be an ML-based classification model that is configured to determine if an input sample file is associated with malware.

To determine whether the modified sample file 132 is associated with malware, the malware classification engine 128 may reference the classification model 175, which may, for example, be stored in the storage 123 of the modification computing device 120. The classification model 175 may include, for example, parameters that control a performance of the malware classification engine 128 to detect a malicious file and/or malware. The parameters of the classification model 175 may, in some embodiments, express the importance of different indicators extracted from the modified sample file 132 in the classification result 130—indicators such as file capabilities, file integrity, relationships between different segments of the file, file metadata and the like. The structure and the exact nature of the parameters can vary depending on the classification model 175 (e.g., decision trees, neural networks, regression classifiers, etc.), but nonetheless the parameters can be adjusted to change the classification result 130 of the classification model 175. As will be discussed further herein, the classification model 175 may be trained and/or retrained, to adjust the parameters of the classification model 175.

The modification engine 125 may access and/or include one or more generators 126 (e.g., generator 126A, generator 126B, . . . generator 126N). The number of generators 126 illustrated in FIG. 1 is merely an example, and is not intended to limit the embodiments of the present disclosure.

Each generator 126 may be configured to read (e.g., ingest) a sample file 152 of a particular file type or file format, and parse the sample file 152 into one or more sections. For example, the generator 126A may be configured to read and parse a portable executable (PE) file, the generator 126B may be configured to read and parse an executable and linkable format (ELF) file, and the generator 126N may be configured to read and parse a script file (e.g., a Python). These are merely examples for the generators 126 and are not intended to limit the embodiments of the present disclosure. As utilized herein, the sample files 152 may include any type of executable file and/or element, including command lines, interpreted scripts, and URIs, and the generators 126 may be configured to process each and/or all of these types of sample files 152 to generate the modified sample files 132. For example, the sample files 152 may be any type of digital file type or digital file format, for example, a picture file (e.g., a Joint Photographic Experts Group (JPEG), a Graphics Interchange Format (e.g., GIF)), an audio file (e.g., MP3), a video file (e.g., Moving Picture Experts Group (MPEG), MP4), a text file, a PE file, a uniform resource identifier (URI), a portable document format (PDF) file, a Mach-O file (or Mach object file), a Microsoft Office file (e.g., a doc, xlsx, ppt), an ELF file, a script file (e.g., a text file that contains a sequence of debugger commands), and the like. A sample file 152 may include one or more sections, where each section may be a title, a header, a body, a footer, an object (e.g., a table, a picture, object code, a data structure, an object class), a function, a declaration of variables or other programming elements, a comment, a trailer, a Boolean, a number, a name, a string, a page, or the like.

In some embodiments, the modification engine 125 may be configured to receive a request to process a sample file 152, where the request includes the sample file 152 or a sample file identifier. If the request includes the sample file identifier, then the modification engine 125 may use the sample file identifier to retrieve the sample file 152 from its memory (e.g., memory 124), a local database, or a remote database.

In some embodiments, the request includes a modification configuration 155 or a modification configuration identifier. If the request includes the modification configuration identifier, then the modification engine 125 may use the modification configuration identifier to retrieve the modification configuration 155 from its memory (e.g., memory 124), a local database, or a remote database. In some embodiments, the modification configuration 155 indicates a group of attacks and one or more attack rules (sometimes referred to as a generator mode) for modifying the sample file 152 (or a copy of the sample file 152) based on the group of attacks to generate the one or more modified sample files 132.

In some embodiments, the modification engine 125 may be configured to determine a file type or file format of the sample file 152. In some embodiments, the modification engine 125 may select, based on the file type of the sample file 152, a particular generator 126 from the generators 126 and use the selected generator 126 to modify (e.g., alter, change) the sample file 152 (or a copy of the sample file 152) to generate the modified sample file 132. For example, if the sample file 152 is a PE file, then the modification engine 125 may select the generator (e.g., generator 126A) that is configured to read and parse a PE file. However, if the sample file 152 is an ELF file, then the modification engine 125 may select the generator (e.g., generator 125B) that is configured to read and parse an ELF file.

In some embodiments, the modification engine 125 may be configured to modify, based on the modification configuration 155, the sample file 152 (or a copy of sample file 152) to generate a plurality of modified sample files 132. For example, the modification configuration 155 may indicate a plurality of modifications to be made, and the sample file 152 may be modified to generate a plurality of modified sample files 132.

The generators 126 of the modification engine 125 may be configured to perform a variety of different modifications to the sample file 152. In some embodiments, the modifications may be similar to the types of obfuscations that are performed by malware to evade detection (e.g., by a detection program such as malware classification engine 128). Non-limiting examples of the types of modifications that may be performed include the addition of text into the sample file 152, the addition of sections into the sample file 152, modifying a section header table of the sample file 152, and/or adding random data and/or fields into the sample file 152. It will be understood that other types of modifications are possible without deviating from the scope of the present disclosure.

In some embodiments, the modification engine 125 may be configured to modify, based on the modification configuration 155, the sample file 152 by determining that the one or more attack rules of the modification configuration 155 include a particular type of modification. For example, in some embodiments, the modification configuration 155 may specify that one modification associated with each specified attack of the modification configuration 155 is to be performed on the sample file 152 to generate the modified sample file 132 (e.g., "one_attack_per_file"). In other words, if the one_attack_per_file mode is selected, then the modification engine 125 uses the attacks that are listed in the modification configuration 155 to create a modified sample file 132 for each attack. For example, if the modification configuration 155 includes four attacks, then the modification engine 125 will create four modified sample files 132 from the sample file 152.

In some embodiments, the modification configuration 155 may specify that the attacks of the modification configuration 155 are to be combined to modify the sample file 152 to generate the modified sample file 132 (e.g., "combine_attack"). In other words, if the combine_attack mode is selected, then the modification engine 125 may simultaneously apply all the attacks of the modification configuration 155 to the sample file 152 to create the modified sample file 132.

In some embodiments, the modification configuration 155 may specify that the attacks of the modification configuration 155 are to be combined in a specific way to modify the sample file 152 to generate the modified sample file 132 (e.g., "specified_combination"). In other words, if the specified_combination mode is selected, then the modification engine 125 may create a modified sample file 132 for each specified attack combination of the modification configuration 155.

In some embodiments, the modification engine 125 may be configured to provide the modified sample file 132 to the malware classification engine 128 to generate a classification result 130 that indicates whether the modified sample file 132 is malicious or non-malicious (e.g., whether the modified sample file 132 is associated with malware). In some embodiments, the classification result 130 generated by the malware classification engine 128 and/or the modified sample file 132 generated by the modification engine 125 may be provided to the caller of the common interface in response to the initial request to the modification computing device 120.

The use of the common interface of the modification computing device 120 may allow for a systematic way to determine whether particular types of attacks are successful in evading malware detection (e.g., by malware classification engine 128). For example, if a given sample file 152 is known to be associated with malware that is detectable by the malware classification engine 128, it may be provided to the modification computing device 120 along with a modification configuration 155 that includes one or more attack modifications to make to the sample file 152. The modification computing device 120 (e.g., by utilizing the modification engine 125) may modify the sample file 152 according to the modification configuration 155 to generate one or more modified sample files 132, and provide the modified sample files 132 to the malware classification engine 128 to generate a classification result 130. If the classification result 130 indicates that the modified sample file 132 is not associated with malware (e.g., an incorrect result), then the modification performed by the modification engine 125 based on the attacks of the modification configuration 155 was successful in evading the classification model 175 of the malware classification engine 128. As will be described further herein, this information may be utilized by the assessment computing device 110 to improve the robustness of the malware classification engine 128 and/or the classification model 175.

The assessment computing device 110 may include a training engine 180. The training engine 180 may be configured to train a malware classification model 175. The classification model 175 that is trained by the training engine 180 may be the same and/or similar as the classification model 175 utilized by the malware classification engine 128 of the modification computing device 120. As part of training the classification model 175, the training engine 180 may obtain and/or generate training samples 162. The training samples 162 may be similar to the sample files 152 described herein with respect to the modification computing device 120. For example, the training samples 162 may be any type of digital file type or digital file format, for example, a picture file (e.g., JPEG file, a GIF file), an audio file (e.g., MP3), a video file (e.g., MPEG, MP4), a text file, a PE file, a URI, a PDF file, a Mach-O file (or Mach object file), a Microsoft Office file (e.g., a doc, xlsx, ppt), an ELF file, a script file (e.g., a text file that contains a sequence of debugger commands), and the like. A training sample 162 may include one or more sections, where each section may be a title, a header, a body, a footer, an object (e.g., a table, a picture, object code, a data structure, an object class), a function, a declaration of variables or other programming elements, a comment, a trailer, a Boolean, a number, a name, a string, a page, or the like.

The training engine 180 may further generate modified samples 166 (e.g., modified sample files), which, in some embodiments, may be modifications of one or more of the training samples 162. In some embodiments, the modifications utilized to generate the modified samples 166 may be based on a training configuration 185. For example, the training configuration 185 may describe one or more modifications and/or attacks that may be made with respect to the training samples 162. To generate the modified samples 166, the training engine 180 may request the modification from the modification computing device 120. For example, the training engine 180 may provide one or more training samples 162 as the sample file(s) 152 in a request to the modification computing device 120. As part of the request, the training engine 180 may provide the training configuration 185 as the modification configuration 155. In response to the request, the modification computing device 120 (e.g., the modification engine 125) may return the modified sample files 132 to the training engine 180. The modified sample files 132 may be used as the modified samples 166 for training the classification model 175.

As part of training the classification model 175, the training engine may generate training vectors 164 from the training samples 162 and modified sample vectors 168 from the modified samples 166. More detail will be provided herein with respect to training the classification model 175.

Once trained, the classification model 175 may be assessed by the attack generation engine 190. To assess the classification model 175, the attack generation engine 190 may generate a plurality of modifications and/or attacks that may be used to modify sample files (e.g., training samples 162) known to be associated with malware in an attempt to evade detection by the classification model 175. The attack generation engine 190 may include a plurality of modification models 196 (e.g., modification model 196A, modification model 196B, modification model 196N). The modification models 196 may be configured to automatically generate an attack configuration 195 that modifies the training samples 162 (or other sample files) to generate assessment samples 192 in ways that are intended to evade detection of the malware associated with the assessment sample 192.

To generate the assessment samples 192, the attack generation engine 190 may select one or more of the modification models 196. The selected modification model 196 may request a modification of one of the training samples 162 (or other file) from the modification computing device 120 to generate the assessment sample 192. For example, the selected modification model 196 may generate an attack configuration 195 and provide one or more training samples 162 as the sample file(s) 152 in a request to the modification computing device 120. As part of the request, the selected modification model 196 may provide the attack configuration 195 as the modification configuration 155. In response to the request, the modification computing device 120 (e.g., the modification engine 125) may return the modified sample files 132 and the classification result 130 to the selected modification model 196.

The modification model 196 may be configured to analyze the returned classification result 130 to determine if the attack was successful. The modification model 196 may be configured to adjust the attack configuration 195 based on the classification result 130 and repeat the modification operation utilizing the updated attack configuration 195. In some embodiments, different ones of the modification models 196 may adjust the attack configuration 195 differently. In some embodiments, different modification models 196 may be utilized for different types of types of assessment samples 192.

In some embodiments, the different modification models 196 may represent different ML models that are trained to vary the modifications and/or attacks in a semi-supervised manner until one or more attacks is found that evades detection. For example, in some embodiment, the modification models 196 may include a first modification model 196A that includes heuristic learning, a second modification model 196B that includes reinforcement learning (RL), and a third modification model 196N that includes genetic programming (GP). The number and type of the modifications models 196 are merely examples, and are not intended to limit the embodiments of the present disclosure.

RL is a semi-supervised approach that can be used to combine a sequence of adversarial attacks in order to evade detection of a file or process by a classification model. Semi-supervised with respect to RL refers to a reward structure specification a priori (to distinguish from unsupervised where no ad-hoc or external information is needed). Tabular learning may be a special case of RL suitable for small-scale action spaces (e.g., a set of possible adversarial attacks). Heuristic learning may include the special case of tabular learning applied to populations of files or processes (instead of individual samples). In some embodiments, GP (or Genetic Algorithms) are population-based methods that may be applied as a complementary method to RL. Where RL utilizes a reward structure, GP may utilize a fitness score definition. Additional details of the operation of the attack generation engine 190 and/or the modification models 196 will be described herein.

The configuration of the assessment computing device 110 and the modification computing device 120 in FIG. 1 is an example, and is not intended to limit the embodiments of the present disclosure. For example, though the assessment computing device 110 and the modification computing device 120 are illustrated in FIG. 1 as separate computing devices, in some embodiments, the elements of the assessment computing device 110 and the modification computing device 120 may be provided in a single computing device. In some embodiments, the malware classification engine 128 may be performed by another computing device, or may be part of the assessment computing device 110. Other configurations of the functionalities represented in FIG. 1 may be possible without deviating from the scope of the embodiments of the present disclosure.

Figure 2:
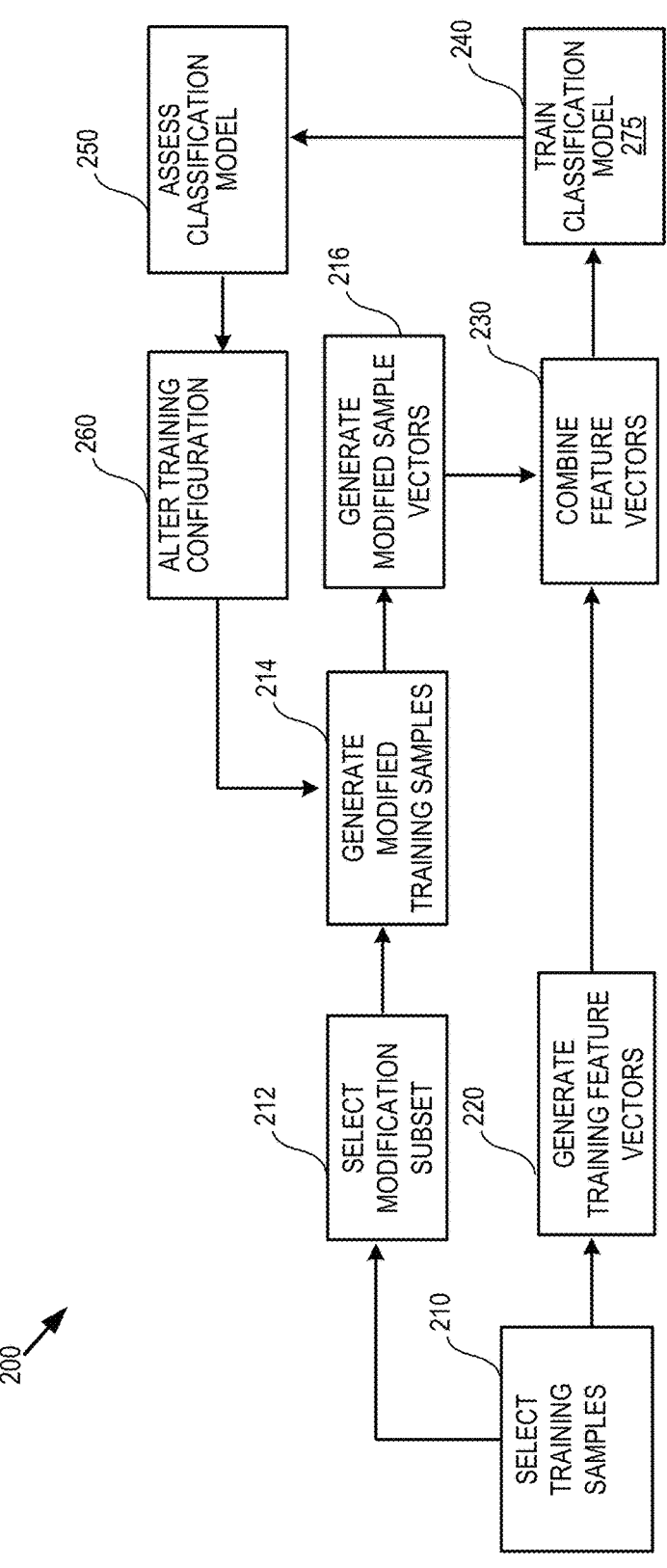
FIG. 2 is a flow diagram of a method for generating and assessing a classification model, according to some embodiments of the present disclosure.

FIG. 2 is a flow diagram of a method 200 for generating and assessing a classification model 175, according to some embodiments of the present disclosure. A description of elements of FIG. 2 that have been previously described will be omitted for brevity. Method 200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 200 may be performed by a computing device (e.g., assessment computing device 110 and/or modification computing device 120).

With reference to FIG. 2, method 200 illustrates example functions used by various embodiments. Although specific function blocks ("blocks") are disclosed in method 200, such blocks are examples. That is, embodiments are well suited to performing various other blocks or variations of the blocks recited in method 200. It is appreciated that the blocks in method 200 may be performed in an order different than presented, and that not all of the blocks in method 200 may be performed.

Referring to both FIG. 1 and FIG. 2, assessment of a classification model 175 may begin with training the classification model, and training the classification model 175 may include generating samples (e.g., training samples 162 and/or modified samples 166). For example, at block 210, training samples 162 may be selected. The training samples 162 may include one or more files (e.g., executables, images, scripts, etc.) for which the malware status is known. For example, it may be known whether a given training sample 162 is associated with malware, and this may be used as a ground truth for training the classification model 175.

At block 220, training feature vectors (e.g., training feature vectors 164 in FIG. 1) may be generated from the training samples 162. In some embodiments, the training feature vectors 164 may be generated by executing a feature extractor, such as a previously-trained computational model, on respective ones of the training samples 162 to generate the training feature vectors 164. Non-limiting examples of features that may be included as part of the training feature vectors 164 include, but are not limited to, an entropy of the training sample 162, an entropy of a segment or other portion(s) of the training sample 162 (e.g., a TEXT or DATA segment), an entropy of a subset of the training sample 162 (e.g., of multiple sections), character(s) or symbol(s), or hash(es) or other representation(s), of human-readable text ("printable strings") included in the training sample 162, a number of printable strings in the training sample 162, flags or other values of standardized headers in the training sample 162, (e.g., the MZ or PE headers or the DLL), an import table of a WINDOWS executable file, flags or other values of other headers or structures in the training sample 162 (e.g., comp. id values found in the rich header in a WINDOWS executable file), contents of the training sample 162 (e.g., ten (or another number of) bytes at the entry point or the beginning of main( ) in an executable file), size of the training sample 162 (e.g., in bytes), SHA-256 or other cryptographic hash value(s) of at least portion(s) of the training sample 162 (e.g., of headers, individual sections, metadata, version information, or icons, text, fonts, audio, graphics, or other content assets embedded or included in the training sample 162), a file type of the training sample 162 (e.g., as output by pefile, PEID, TrID, or file(1)), n-grams within the training sample 162, and/or other relevant details of the training sample 162.

In operation 212, a subset of the training samples 162 may be selected for modification. In some embodiments, the subset may be selected based on the type of training sample file 162. In some embodiments, the subset may be selected randomly.

At operation 214, modified sample files 166 may be generated from the subset of the training samples 162 that were selected in operation 212. As discussed herein with respect to FIG. 1, the modified sample files 166 may be generated through a request to the modification computing device 120 (e.g., a common modification interface) based on a training configuration 185 that defines a default set of attacks and/or modifications. The subset of the training samples 162 selected in operation 212 may be provided along with the training configuration 185 to the modification computing device 120, and the modified sample files 166 may be received in return.

At operation 216, modified sample vectors 168 may be generated from the modified sample files 166. In some embodiments, the generation of the modified sample vectors 168 for the modified samples 166 may be similar to the generation of the training feature vectors 164 from the training samples 162 discussed herein with respect to operation 220.

Once the training feature vectors 164 and the modified sample vectors 168 have been generated, they may be combined in operation 240 and utilized to train the classification model 175 in operation 275. Further details with respect to training the classification model 175 will be described with respect to FIG. 3.

Figure 3:
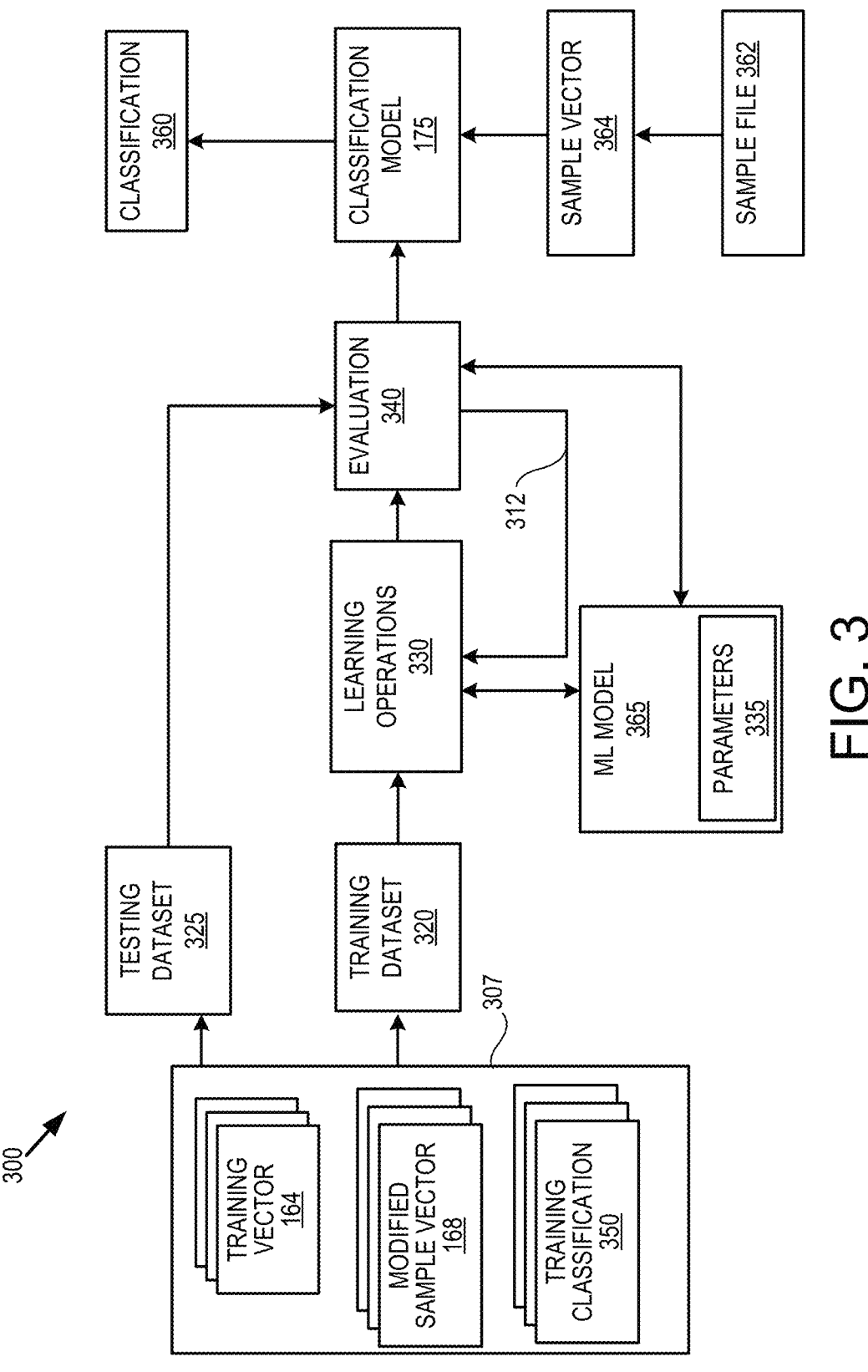
FIG. 3 is a block diagram illustrating an example training system for performing a machine learning operation based on training vectors and modified sample vectors, according to some embodiments of the present disclosure.

FIG. 3 is a block diagram illustrating an example training system for performing a machine learning operation based on training vectors 164 and modified sample vectors 168, according to some embodiments of the present disclosure. A description of elements of FIG. 3 that have been previously described will be omitted for brevity.

Referring to FIGS. 1 and 3, a system 300 for performing a machine learning operation may include learning operations 330 which perform a feedback controlled comparison between a training dataset 320 and a testing dataset 325 based on the training vectors 164 and the modified sample vectors 168. In some embodiments, the system 300 may be implemented by a training engine 180 of the assessment computing device 110, as illustrated in FIG. 1. However, the embodiments of the present disclosure are not limited to such a configuration. In some embodiments, a classification model 175 may be pre-trained and provided to the assessment computing device 110.

In some embodiments, the training vectors 164, generated from the training samples 162 as described herein, and the modified sample vectors 168 may be combined with respective training classification values 350 associated with the training vectors 164 and the modified sample vectors 168 to generate sample-specific input data 307. More specifically, a training vector 164 of a particular training sample 162 may be combined with a training classification value 350 for the particular training sample 162 (e.g., whether the training sample 162 is associated with malware). Similarly, a modified sample vector 168 generated from a modification of a particular training sample 162 may be combined with a training classification value 350 for the particular training sample 162 (e.g., whether the training sample 162 is associated with malware). The training classification value 350 for the training sample 162 (and the corresponding modified training sample 166) may identify whether the training sample 162 contains or is associated with malware. In some embodiments, as part of training the classification model 175, particular training samples 162 with known classifications (e.g., it is known whether the training sample 162 contains or is associated with malware) may be collected and training vectors may be generated therefrom. The known classification and the known explanation of a given training sample 162 (and a modification of the training sample 162) may be used as the training classification value 350, and combined with the training vector 164 or the modified sample vector 168 to form the sample-specific input data 307 for that training sample 162 and/or modified sample 166.

In some embodiments, a training vector 164 may be generated from a training sample 162 that is known to contain or be associated with malware. Thus, a training classification value 350 of the known-bad training sample 162 may be generated indicating that the training sample 162 is associated with malware. The training vector 164 may be combined with the training classification value 350 (e.g., malware) to generate the sample-specific input data 307 for that training sample 162.

Similarly, a modified sample vector 168 may be generated from a modified sample 166 that was generated by modifying a training sample 162 that is known to contain or be associated with malware. Thus, a training classification value 350 of the known-bad modified sample 166 may be generated indicating that the modified sample 166 is associated with malware. The modified sample vector 169 may be combined with the training classification value 350 (e.g., malware) to generate the sample-specific input data 307 for that modified sample 166.

In some embodiments, a training vector 164 may be generated from a training sample 162 that is known to be free of malware. Thus, a training classification value 350 of the known-good training sample 162 may be generated indicating that the training sample 162 is not associated with malware. The training vector 164 may be combined with the training classification value 350 (e.g., malware-free) to generate the sample-specific input data 307 for that training sample 162.

Similarly, a modified sample vector 168 may be generated from a modified sample 166 that was generated by modifying a training sample 162 that is known to be free of malware. Thus, a training classification value 350 of the known-good modified sample 166 may be generated indicating that the modified sample 166 is not associated with malware. The modified sample vector 168 may be combined with the training classification value 350 (e.g., malware-free) to generate the sample-specific input data 307 for that modified sample 166.

In this way, sample-specific input data 307 may be generated for each training sample 162 and/or modified sample 166 used for training the classification model 175. The sample-specific input data 307 may be separated into two groups: a training dataset 320 and a testing dataset 325. Each group of the training dataset 320 and the testing dataset 325 may include sample-specific input data 307 (e.g., feature vectors and their associated training classification value) for a plurality of training samples 162 and/or modified samples 166.

Learning operation 330 may be performed on the training dataset 320. The learning operations 330 may examine the training vectors 164 and/or modified sample vectors 168 to establish a relationship between the elements of the training vectors 164 and/or modified sample vectors 168 that accurately predict the classification value 350 (e.g., malware or not malware) for a given sample. The learning operations 330 may generate a ML training model 365 that represents the determined relationship. The ML training model 365 may take a feature vector (e.g., a training vectors 164 and/or a modified sample vector 168) as input, and output a predicted classification value (e.g., malware or non-malware) for the input. The learning operations 330 may attempt to adjust parameters 335 of the ML training model 365 to generate a best-fit algorithm that describes a relationship between the training vectors 164 and/or modified sample vectors 168 and the training classification value 350 for all of the samples of the training dataset 320. A set of parameters 335 may be selected based on the training dataset 320 and preliminarily established as the ML training model 365.

The results of the learning operations 330 may be provided to an evaluation operation 340. The evaluation operation 340 may utilize the ML training model 365 generated by the learning operations 330 (based on the training dataset 320) to see if the ML training model 365 correctly predicts the training classification value 350 for the training vectors 164 and/or modified sample vectors 168 of the testing dataset 325. If the ML training model 365 accurately predicts the training classification values 350 of the testing dataset 325, it may be promoted to the classification model 175. If the ML training model 365 does not accurately predict the training classification values 350 of the testing dataset 325, feedback 312 may be provided to the learning operations 330, and the learning operations 330 may be repeated, with additional adjustment of the parameters 335. This process of learning operations 330 and evaluation operation 340 may be repeated until an acceptable classification model 175 is generated.

Once the classification model 175 is generated, it may be used to predict classifications 360 for production sample files 362. For example, for a production sample file 362, a sample vector 364 may be generated, as described herein. The sample vector 364 may be provided to the classification model 175. The operations of the classification model 175 may generate the classification 360 (e.g., whether or not the production sample files 362 associated with the sample vector 364 contains and/or is associated with malware). In some embodiments, the trained classification model 175 may be utilized by the malware classification engine 128 to generate the classification result 130, as described herein with respect to FIG. 1.

Referring back to FIG. 2, as well as FIG. 1, once the classification model 175 has been generated, it may be assessed in operation 250. Assessing the robustness of the classification model 175 may be performed, for example, by attack generation engine 190, described herein with respect to FIG. 1. Details of the assessing the classification model 175 will be described with respect to FIG. 4.

Figure 4:
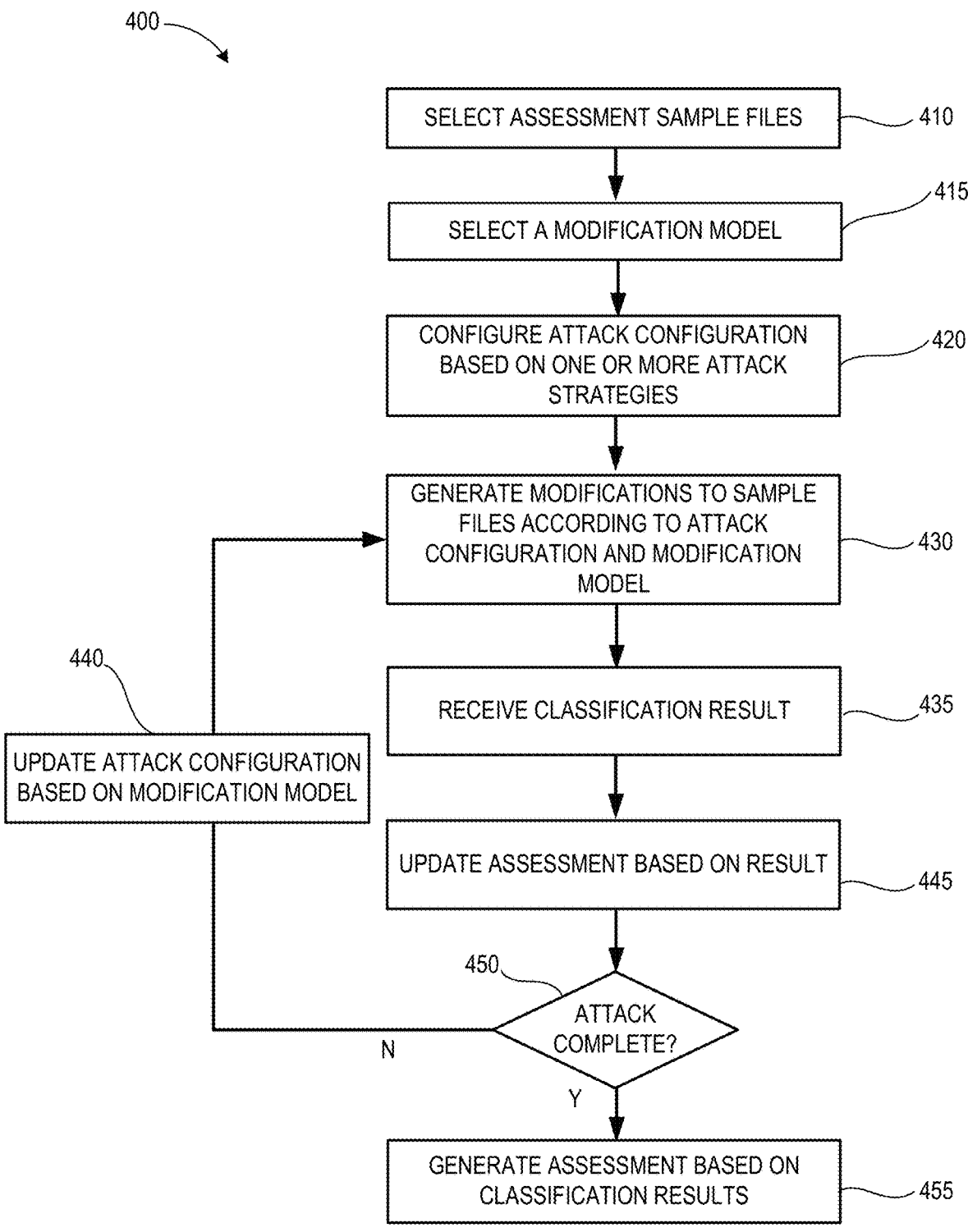
FIG. 4 is a flow diagram of a method assessing a classification model, according to some embodiments of the present disclosure.

FIG. 4 is a flow diagram of a method 400 assessing a classification model 175, according to some embodiments of the present disclosure. A description of elements of FIG. 4 that have been previously described will be omitted for brevity. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., assessment computing device 110 and/or modification computing device 120).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring to both FIG. 1 and FIG. 4, the method 400 may begin with operation 410, in which a set of assessment sample files 192 may be selected. In some embodiments, the assessment sample files 192 may be selected from the training sample files 162 utilized to train the classification model 175, but embodiments of the present disclosure are not limited to such a configuration. In some embodiments, one or more of the assessment sample files 192 may be different from the training samples 162 utilized to train the classification model 175. The assessment samples 192 may be any type of digital file type or digital file format, for example, a picture file (e.g., a JPEG file, a GIF file), an audio file (e.g., MP3), a video file (e.g., MPEG, MP4), a text file, a PE file, a URI, a portable document format (PDF) file, a Mach-O file (or Mach object file), a Microsoft Office file (e.g., a doc, xlsx, ppt), an ELF file, a script file (e.g., a text file that contains a sequence of debugger commands), and the like. An assessment sample 192 may include one or more sections, where each section may be a title, a header, a body, a footer, an object (e.g., a table, a picture, object code, a data structure, an object class), a function, a declaration of variables or other programming elements, a comment, a trailer, a Boolean, a number, a name, a string, a page, or the like.

The method 400 may continue to operation 415 in which a modification model 196 is selected. For example, the attack generation engine 190 may select one or more of the plurality of modification models 196. As previously described, each of the modification models 196 may implement a different ML strategy for modifying sample files to generate attacks for a classification model 175. For examples, the plurality of modification models 196 may include an ML model based on heuristic learning, an ML model based on reinforcement learning, and/or an ML model based on genetic programming. Embodiments of the present disclosure are not limited to the selection of a single modification model 196. In some embodiments, a plurality of modification models 196 may be selected. In some embodiments, all of the plurality of modification models 196 may be sequentially attempted.

In some embodiments, the modification model 196 may be selected based on a type of the assessment samples 192. For example, in some embodiments, the algorithms of some of the modification models 196 may work better with certain types of assessment samples 192. For example, some types of genetic programming may involve random modifications that may be more functionally compatible with script files. As a result, if the assessment samples 192 are primarily script files, a modification model 196 may be selected that utilizes genetic programming.

At operation 420, an attack configuration 195 may be configured based on one or more attack strategies. In some embodiments, the one or more attack strategies may be selected based on the selected modification model 196 and/or the selected assessment samples 192. In some embodiments, the attack strategies may be similar to the type of generators 126 utilized by the modification engine 125, as described herein with respect to FIG. 1. For example, the attack strategies may mimic the types of obfuscations that are performed by malware to evade detection (e.g., by a detection program such as malware classification engine 128). Non-limiting examples of the types of attack strategies that may be selected include the addition of text into the assessment sample 192, the addition of sections into the assessment sample 192, modifying a section header table of the assessment sample 192, and/or adding random characters and/or fields into the assessment sample 192. Other types of modifications include adding a function to the import address table that is never used, manipulating existing section names, creating new (unused) sections, appending bytes to extra space at the end of sections, creating a new entry point which jumps to the original entry point, removing signer information, manipulating debug information, packing or unpacking the assessment sample 192, modifying a header checksum, and/or appending bytes to the overlay (end of PE file). It will be understood that other types of modifications are possible without deviating from the scope of the present disclosure. Once selected, the attack strategies may be collected into the attack configuration 195.

In operation 430, modifications to the assessment sample 192 may be generated according to the attack configuration 195 and the selected modification model 196. In some embodiments, the modification may represent different variations of the attack(s) that compose the attack configuration 195, as selected based on the modification model 196. For example, if the attack strategy is to insert random values into the assessment sample 192, generating the modification may include selecting different random values, random values of different sizes, and/or random values placed at different locations. Different modification models 196 may select the attack variations differently and, as a result, selecting a different modification model 196 may result in a different set of modifications to an assessment sample 192 for a same attack strategy and/or attack configuration.

To generate the modification, the assessment sample 192, along with the attack configuration 195, may be sent to the modification computing device 120. For example, the attack generation engine 190 may provide the assessment sample file 192 as the sample file(s) 152 in a request to the modification computing device 120. As part of the request, the attack generation engine 190 may provide the attack configuration 195 as the modification configuration 155. In response to the request, the modification computing device 120 (e.g., the modification engine 125) may return the modified sample files 132 and/or the classification result 130 to the attack generation engine 190. The classification result 130 may be utilized to determine if the attack was successful.

For example, if the attack strategy is to insert random characters into the assessment sample 192, where the assessment sample 192 is known to contain and/or be associated with malware, the attack configuration 195 may be constructed by the selected modification model 196 to include a number of different variations of random characters (e.g., different characters, different lengths of random characters, and/or different locations of the random characters). The attack configuration 195, along with the assessment sample 192, may be sent to the modification computing device 120. The modification computing device 120 (e.g., the modification engine 125) may generate one or more modified sample files 132 (see FIG. 1) that correspond to the different modifications outlined in the attack configuration 195. These modified sample files 132 may be provided to the classification engine 128 to be processed by the classification model 175 to generate a classification result 130. The classification result 130, as well as the modified sample files 132, may be returned to the attack generation engine 190 in response to the request.

At operation 435, the classification result 130 may be received (e.g., by the attack generation engine 190). The classification result 130 may indicate whether the attack was successful in evading detection from the classification model 175. For example, if the attack strategy was to insert random characters into an assessment sample 192 known to contain malware, then a classification result 130 indicating a lack of malware may identify the attack as evading the classification model 175.

At operation 445, an assessment of the classification model 175 may be updated based on the classification result 130. For example, if the modification generated at operation 430 was successful in evading the classification model 175, then the successful attack strategy (e.g., the modification that was made) may be recorded, as well as a copy of the assessment sample 192 that evaded the classification model 175.

At operation 450, it may be determined whether the attack is complete. For example, in some embodiments, the attacks and/or modifications may be executed for a number of iterations, with the attacks evolving over time, in accordance with the selected modification model 196.

If the attack is not complete (operation 450: N), then the method 400 may continue with operation 440 in which the attack configuration 195 is updated. In some embodiments, updating the attack configuration 195 may be performed based on the type of modification model 196 selected. For example, based on the success or failure of the prior iteration, different modification models 196 may update the attack configuration 195 differently. Additional detail with respect to the variations between the modification models 196 will be described with respect to FIGS. 5A, 5B, and 5C.

If the attack is complete (operation 450: Y), then the method 400 may continue with operation 455, in which an assessment of the classification model 175 is generated based on the classification results 130 obtained by the modification model 196. For example, the assessment may identify whether the modification model 196 was successful in modifying an assessment sample 192 that is known to contain malware in a way that evaded detection of the malware by the classification model 175. In some embodiments, the assessment may include some or all of the assessment samples 192 that were able to evade detection.

As described herein, different modification models 196 may generate different attack strategies and/or attack configurations 195, which may lead to different modifications in an attempt to evade malware classification. In some embodiments, the modification models 196 may be ML-based, and may be configured to learn which techniques are most successful in evading malware detection, and to learn combinations of attack strategies that may be more successful in combination than the individual attacks. By utilizing ML-based modification models 196, different types of attack strategies may be learned, which may be utilized to improve the training of the classification model.

Figure 5A:
FIG. 5A illustrates a flow diagram of a modification model based on heuristic learning, according to some embodiments of the present disclosure.

FIG. 5A illustrates a flow diagram of a modification model 196A based on heuristic learning, according to some embodiments of the present disclosure. A description of elements of FIG. 5A that have been previously described will be omitted for brevity.

The modification model 196A may utilize heuristic learning techniques to select particular attacks to attempt against a classification model 175 (e.g., modifications to make to a training sample 162 in an attempt to evade a detection of malware by the classification model 175). In some embodiments, heuristic learning may include generating a subset of potential attacks and then sequentially processing the subset (and the associated modifications) to determine if one or more of the attacks are successful at evading the classification model 175.

Referring to FIG. 5A and the prior figures, the modification model 196A may perform operation 502 in which a subset of known attacks are selected and a corresponding attack configuration 195 is generated. For example, a subset of adversarial attacks (for example, top 5) may be identified from a set of attacks (for example, 30) that achieves relatively high rates of evasion when applied to a set of samples. Each of the attacks may be associated with a modification of a sample file.

Based on the identified attacks, the attack configuration 195 may be generated. The attack configuration 195 may specify each of the attacks (e.g., modifications) to be performed on the training samples 162 to generate the assessment samples 192.

At operation 504, the sample files may be modified using one of the subset of identified attacks. For example, if the top five adversarial attacks (and associated modifications) are selected, the one of the top five attacks may be identified, and a training sample 162 may be modified consistently with the attack to generate an assessment sample 192. As discussed herein with respect to FIG. 1, the assessment sample 192 may be generated through a request to the modification computing device 120 (e.g., a common modification interface) based on an attack configuration 195 that defines the set of attacks and/or modifications. The training sample may be provided along with the attack configuration 195 to the modification computing device 120.

At operation 506, the classification result 130 may be received from the modification computing device 120. The classification result 130 may indicate if the assessment sample 192 was successful in evading the classification model of the modification computing device 120. The received classification result 130 may be analyzed in operation 508.

If the classification result 130 indicates that the assessment sample 192 did not evade the classification model 175 (operation 508: N), the modification model 196A may continue to operation 512 in which is determined whether the attack is complete.

If the classification result 130 indicates that the assessment sample 192 was able to successfully evade the classification model 175 (operation 508: Y), the modification model 196A may add the attack to the list of successful attacks and may add the assessment sample 192 to a list of assessment samples 192 that successfully evade malware detection.

At operation 512, if the attack is not complete, the operations may revert to operation 504 in which another modification process is performed based on the selected subset of attacks. The modifications may continue until all of the selected attacks (and their associated modifications) have been performed, and a determination has been made as to whether the modification allows for an assessment sample 192 containing malware to be undetected by the classification model 175.

At operation 512, if the attack is complete, an assessment of the classification model 175 may be generated in operation 514. The assessment may indicate which of the assessment samples 192, if any, were able to evade malware detection. In some embodiments, the assessment may include an attack configuration 195 that includes successful attacks on the classification model 175. The attack configuration 195 may identify the modifications that resulted in assessment sample files 192 containing malware that evaded detection by the malware classification model 175. In some embodiments, the resulting attack configuration 195 may be added to the training configuration 185 to be used in eventual retraining of the classification model 175, as will be described further herein.

An algorithm to describe the heuristic learning model incorporated by the modification model 196A is described below utilizing pseudocode and/or text. For purposes of the description, the modification model 196A may include a sample set S (e.g., a subset of the training set of training samples 162), an attack set A (e.g., add 100 Bytes of random overlay, add one new section), a generator G for applying attacks to a sample, resulting in a modified sample (which may be performed, for example, by the modification engine 125 as described herein), and/or a classification model M (for example, classifier with a threshold resulting in a binary decision 0=clean or 1=dirty). An algorithm for heuristic learning may include:

```
Require: integer k < |A|
for a in A do
    count_evasions(a) = 0
    for s in S do
        x = G(s, a)
        count_evasions(a) += (M(s)==1 and M(x)==0)
    end for
end for
A_HL = subset(A, size=k, sort_by=desc(count_evasions))
Output: attack shortlist, A_HL
```

The modification model 196A may perform its operations over a large number of training samples 162 and/or modifications. The large number of repetitions may allow the modification model 196A based on heuristic learning to explore a large number of potential sample modifications.

Figure 5B:
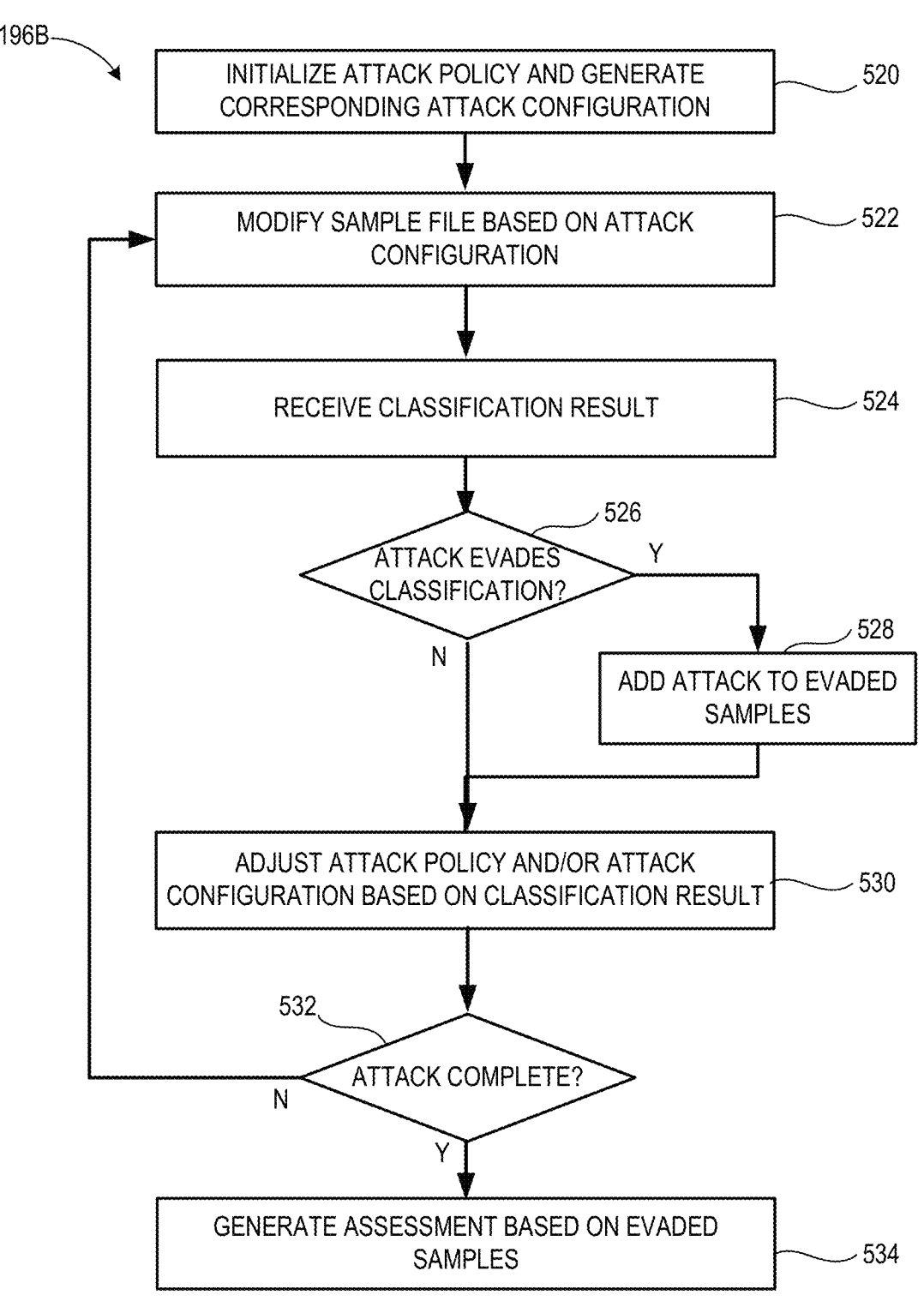
FIG. 5B illustrates a flow diagram of a modification model based on reinforcement learning, according to some embodiments of the present disclosure.

FIG. 5B illustrates a flow diagram of a modification model 196B based on reinforcement learning, according to some embodiments of the present disclosure. A description of elements of FIG. 5B that have been previously described will be omitted for brevity.

The modification model 196B may utilize reinforcement learning techniques to select particular attacks to attempt against a classification model 175 (e.g., modifications to make to a training sample 162 in an attempt to evade a detection of malware by the classification model 175). In some embodiments, reinforcement learning may include generating a particular attack and/or modification to a training sample file 162 based on prior success in evading the classification model 175. The reinforcement learning of the modification model 196B may run a series of learning episodes each of which starts from an original sample and aims to create an evasive sample through successive generation of adversarial variants. Tracking the evasive success or failure allows refining the selection method of attacks (e.g. updates to the attack policy and/or attack configuration 195) for other samples in following episodes.

Referring to FIG. 5B and the prior figures, the modification model 196B may perform operation 520 in which an attack policy is initialized and a corresponding attack configuration 195 is generated. For example, one or more attacks may be identified from a set of attacks. In some embodiments, attacks of different types may be selected, such that successes of different types of attacks may be explored. Each of the attacks may be associated with a modification of a training sample 162.

Based on the identified attacks, the attack configuration 195 may be generated. The attack configuration 195 may specify each of the attacks (e.g., modifications) to be performed on the training samples 162 to generate the assessment samples 192.

At operation 522, the sample files may be modified using one of the attacks identified in operation 520 to generate an assessment sample 192. As discussed herein with respect to FIG. 1, the assessment sample 192 may be generated through a request to the modification computing device 120 (e.g., a common modification interface) based on the attack configuration 195 that defines the set of attacks and/or modifications. The training sample 162 may be provided along with the attack configuration 195 to the modification computing device 120.

At operation 524, the classification result 130 may be received from the modification computing device 120. The classification result 130 may indicate if the assessment sample 192 was successful in evading the classification model of the modification computing device 120. The received classification result 130 may be analyzed in operation 526.

If the classification result 130 indicates that the assessment sample 192 was able to successfully evade the classification model 175 (operation 526: Y), the modification model 196B may add the attack to the list of successful attacks and may add the assessment sample 192 to a list of assessment samples 192 that successfully evade malware detection.

In operation 530, the attack policy and/or attack configuration 195 may be adjusted based on the classification result 130. In some embodiments, a reward may be associated with the classification result 130, and the modification to the attack configuration 195 may be based on the reward. For example, if the assessment sample 192 successfully evades detection, a reward of 1 may be provided, and, if the assessment sample 192 is successfully detected as containing malware, a reward of 0 may be provided. However, the embodiments of the present disclosure are not limited to such a configuration. In some embodiments, the classification result 130 may be a probability that the provided assessment sample file 192 is associated with malware (e.g., a number between 1 and 0). In some embodiments, the reward may reflect the probability. For example, if the classification result 130 indicates a lower probability of the assessment sample file 192 being associated with malware, then a higher reward may be provided. If the classification result 130 indicates a higher probability of the assessment sample file 192 being associated with malware, then a lower reward may be provided. Other possibilities for reward structures are contemplated based on the classification result.

Based on the classification result 130 and/or reward, the attack configuration 195 may be modified. For example, attacks which are identified as being more successful (e.g., have a higher reward) may be reinforced and attempted more frequently and/or with different variations. For example, if it is determined that inserting random characters into a training sample 162 is not successful in evading malware detection, it may be removed and/or de-emphasized from the attack configuration 195. If it is determined that altering sections of the training sample 162 is successful in evading malware detection, different variations of section alteration may be added to the attack configuration 195.

At operation 532, it may be determined if the attack is complete. If the attack is not complete, the operations may revert to operation 522 in which another modification process is performed based on the updated attack configuration 195. The modifications may continue until all of the selected attacks (and their associated modifications) have been performed, and a determination has been made as to whether the modification allows for an assessment sample 192 containing malware to be undetected by the classification model 175.

At operation 532, if the attack is complete, an assessment of the classification model 175 may be generated in operation 534. The assessment may indicate which of the assessment samples 192, if any, were able to evade malware detection. In some embodiments, the assessment may include an attack configuration 195 that includes successful attacks on the classification model 175. The attack configuration 195 may identify the modifications that resulted in assessment sample files 192 containing malware that evaded detection by the malware classification model 175. In some embodiments, the resulting attack configuration 195 may be added to the training configuration 185 to be used in eventual retraining of the classification model 175, as will be described further herein.

An algorithm to describe the reinforcement learning model incorporated by the modification model 196B is described below utilizing pseudocode and/or text. For purposes of the description, the modification model 196B may include the components as described herein for the modification model 196A. An algorithm for reinforcement learning may include:

```
Require: initial action selection policy p0, integer T max
attacks per sample, policy update function F
evaded_samples = [ ]
p = p0
for s in S do
    x = s
    for t = 1 to T do
        a = p(x, A)
        x = G(x, a)
        c = (M(s) == 1 and M(x) == 0)
        p = F(p, a, c)
        if c == 1 then
            evaded_samples += [x]
            exit loop for t...
    end for
end for
```

-continued

---
Output: learned policy p, list of evaded_samples
---

The modification model 196B may perform its operations over a large number of training samples 162 and/or modifications. The large number of repetitions may allow the modification model 196B based on reinforcement learning to hone in on attacks that are successful at evading malware detection. In some embodiments, the operations of the modification model 196B may be performed utilizing machine learning techniques that incorporate the reward structure with respect to malware identification described herein.

Figure 5C:
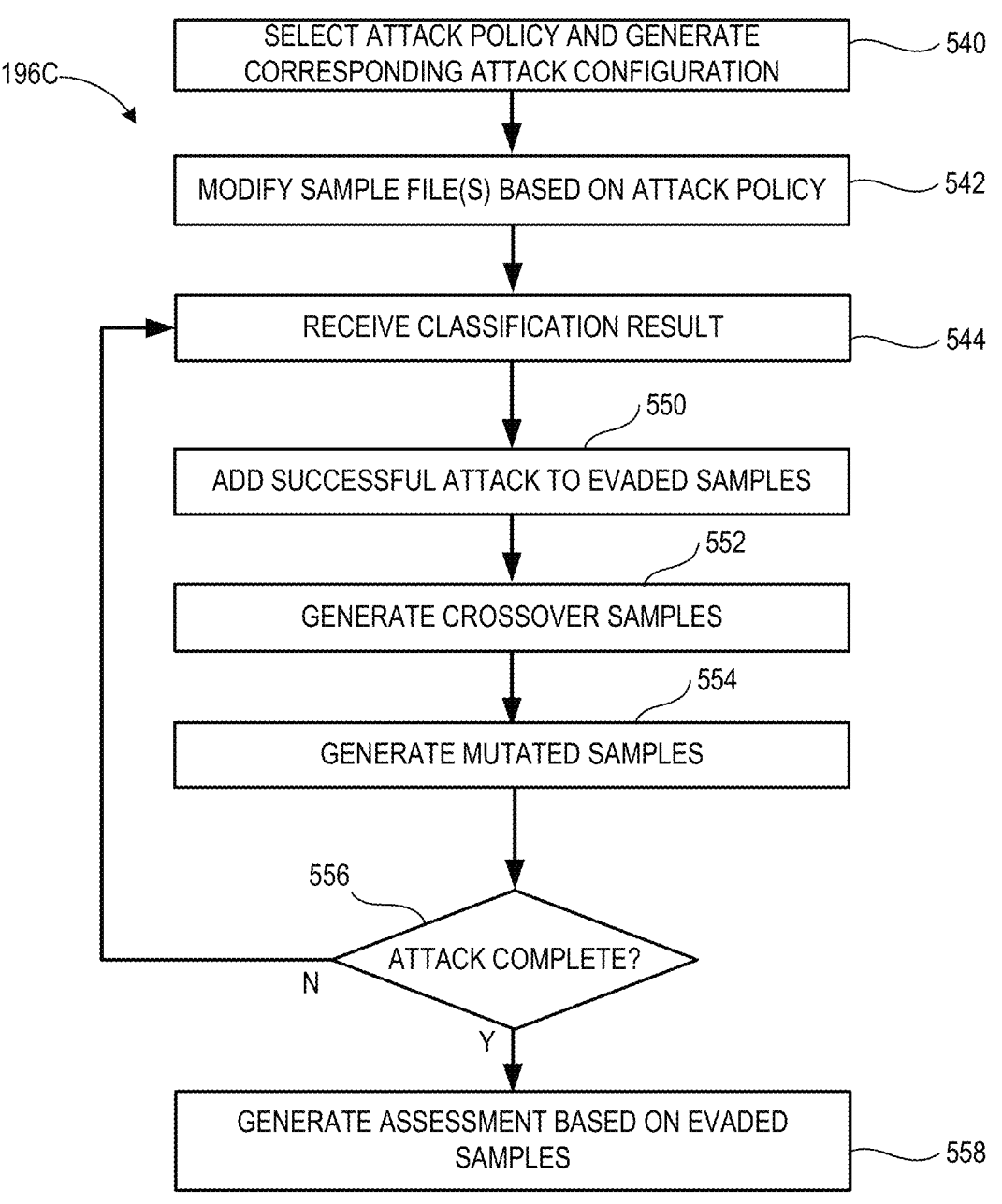
FIG. 5C illustrates a flow diagram of a modification model based on genetic programming, according to some embodiments of the present disclosure.

FIG. 5C illustrates a flow diagram of a modification model 196C based on genetic programming, according to some embodiments of the present disclosure. A description of elements of FIG. 5C that have been previously described will be omitted for brevity.

The modification model 196C may utilize genetic programming techniques to select particular attacks to attempt against a classification model 175 (e.g., modifications to make to a training sample 162 in an attempt to evade a detection of malware by the classification model 175). In some embodiments, genetic programing may include generating a particular attack and/or modification to a population of training samples 162, and tracking success of the population over time. In addition, mutations and other variations may be added to the population of training samples 162 based on prior success in evading the classification model 175. The genetic programming of the modification model 196C may apply iterations of variation, fitness selection (e.g., classification evasion), mutation, and crossover to the population of training samples 162 until meeting a success criterion (e.g., number of training rounds or number of evasive samples obtained).

Referring to FIG. 5C and the prior figures, the modification model 196C may perform operation 540 in which an attack policy is selected and a corresponding attack configuration 195 is generated. For example, one or more attacks may be identified from a set of attacks. In some embodiments, attacks of different types may be selected, such that successes of different types of attacks may be explored. Each of the attacks may be associated with one or more modifications of a training sample 162.

Based on the identified attacks, the attack configuration 195 may be generated. The attack configuration 195 may specify each of the attacks (e.g., modifications) to be performed on the training samples 162 to generate the assessment samples 192.

At operation 542, a population of sample files (e.g., training samples 162) may be selected, and the training samples 162 may be modified using one of the attacks identified in operation 540 to generate a population of assessment samples 192. As discussed herein with respect to FIG. 1, the assessment samples 192 may be generated through a request to the modification computing device 120 (e.g., a common modification interface) based on the attack configuration 195 that defines the set of attacks and/or modifications. The training sample 162 may be provided (e.g., as sample file 152) along with the attack configuration 195 to the modification computing device 120.

At operation 544, the classification result 130 may be received from the modification computing device 120. The classification result 130 may indicate if the assessment sample 192 was successful in evading the classification model 175 of the modification computing device 120.

If the classification result 130 indicates that the assessment sample 192 was able to successfully evade the classification model 175, the modification model 196C may add the assessment sample 192 to a list of assessment samples 192 that successfully evade malware detection at operation 550.

At operation 552, crossover samples may be generated. Crossover samples may refer to a mixing of attacks between assessment samples 192. For example, an attack used in a first assessment sample 192 may be added to a second assessment sample 192, and the resulting crossover assessment sample 192 may be added to the population of assessment samples 192. In some embodiments, the generation of crossover samples may include adding attacks from assessment samples 192 that were successful in evading classification (e.g., based on the classification result 130) to assessment samples 192 that were unsuccessful in evading classification.

At operation 552, mutated samples may be generated. Mutated samples may refer to a random alteration of a successful attack between assessment samples 192. For example, in a mutation, a successful attack that utilizes the insertion of random characters may be modified to insert a different number of random characters than was previously attempted. The resulting mutated assessment sample 192 may be added to the population of assessment samples 192. In some embodiments, for example, an attacks from an assessment sample 192 that was unsuccessful in evading classification (e.g., based on the classification result 130) may be mutated to see if it will be successful in a subsequent round in evading classification.

In this way the population of assessment samples 192 may grow and/or shrink based both on the fitness of the assessment samples 192 (e.g., the ability to evade malware detection) as well as population changes that are made to the assessment samples 192 to determine if alterations may affect (e.g., positively or negatively) the ability to evade malware detection.

At operation 556, it may be determined if the attack is complete. If the attack is not complete, the operations may revert to operation 544 in which the population of assessment samples 192 (which may be altered due to crossover selection and/or mutation) is provided again to the classification model 175 to determine if the classification model 175 is able to detect malware within the population of assessment samples 192. The modifications may continue for a number of training epochs, in which the population of the assessment samples 192 may change based on crossover and mutation modifications.

At operation 556, if the attack is complete, an assessment of the classification model 175 may be generated in operation 558. The assessment may indicate the population of assessment samples 192, if any, that were able to evade malware detection. In some embodiments, the assessment may include an attack configuration 195 that includes successful attacks on the classification model 175. The attack configuration 195 may identify the modifications that resulted in assessment sample files 192 containing malware that evaded detection by the malware classification model 175. In some embodiments, the resulting attack configuration 195 may be added to the training configuration 185 to be used in eventual retraining of the classification model 175, as will be described further herein.

An algorithm to describe the genetic programming model incorporated by the modification model 196C is described below utilizing pseudocode and/or text. For purposes of the description, the modification model 196C may include the components as described herein for the modification model 196A. An algorithm for reinforcement learning may include:

```
Require: integer T training epochs, functions for Variation,
Selection, Crossover, Mutation, Fitness evaluation
evaded_samples = [ ]
for t = 1 to T do
    generate sample variants
    evaluate fitness
    select subset of fit samples
    generate crossover samples
    generate mutated samples
    if is_evasive(x) then
        evaded_samples += [x]
end for
Output: list of evaded_samples
```

The modification model 196C may perform its modifications over large populations, which may allow a large number of modifications to be tested. In addition, the use of crossover functions and mutations may allow for the creation of attacks that might not otherwise be considered if determining the attacks manually and/or serially.

Referring back to FIG. 2, as well as FIG. 1, once the classification model 175 has been assessed in operation 250, the method 200 may continue with operation 260 in which the training configuration 185 is altered based on the assessment of the classification model 175. For example, as discussed herein, as part of the assessment performed by the attack generation engine 190, an attack configuration 195 may be generated that includes attacks determined to be successful in evading detection by the classification model 175. In some embodiments, the elements of the attack configuration 195 may be added to the training configuration 185. In this way, the training configuration 185 may be altered to include new attacks.

Referring still to FIG. 2, in a subsequent training activity of the classification model 175, operation 214 may be performed to generate modified training samples 166, as described herein. However, after the update of the training configuration 185 in response to the assessment described herein, the modified training samples 166 that are generated will include attacks that previously evaded detection by the classification model 175. As a result, the modified training samples 166 resulting from the newly-added attacks will now be used in training the classification model 175, as described herein.

Referring back to FIG. 1, the system 100 described herein provides an automated and integrated way to generate a malware classification model 175 as well as way to assess the model through different learning techniques to iteratively improve the training of the classification model 175. By including the attack generation engine 190 utilizing a plurality of modification models, embodiments of the present disclosure allow for an automated mechanism for generating attack variation, including the ability to vary the attacks based on the type of the sample file. Utilizing the attack generation engine 190, a large number of attacks and modifications may be generated without excess amounts of work. In some embodiments, the modifications may be altered automatically to explore the sample space and generate a more robust classification model 175.

FIG. 6 is a flow diagram of a method 600 for operating a malware detection system, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by a computing device (e.g., assessment computing device 110 and/or modification computing device 120).

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Referring simultaneously to the prior figures as well, the method 600 begins at block 610, which includes selecting a sample file that is associated with malware and a first modification model of a plurality of modification models to alter the sample file. In some embodiments, the sample file may be similar to the training sample 162 described herein with respect to FIGS. 1 to 5C. In some embodiments, the first modification model of the plurality of modification models may be similar to one of the modification models 196 described herein with respect to FIGS. 1 to 5C. In some embodiments, the first modification model is one or more of a heuristic learning model, a reinforcement learning model, or a genetic programming model.

At block 620, operations of the method 600 may include generating, by the first modification model, a modification configuration based on the sample file. The modification configuration may identify a modification to be performed on the sample file. In some embodiments, the modification configuration may be similar to the attack configuration 195 described herein with respect to FIGS. 1 to 5C.

At block 630, operations of the method 600 may include providing the sample file and the modification configuration to a modification engine to generate a modified sample file. In some embodiments, the modification engine may be similar to the modification engine 125 described herein with respect to FIGS. 1 to 5C. In some embodiments, the modified sample file may be similar to the modified sample file(s) 132 and/or the assessment sample file(s) 192 described herein with respect to FIGS. 1 to 5C.

In some embodiments, the modification engine is to perform operations including: receiving the sample file and the modification as part of a request communication; modifying the sample file based on the modification configuration to generate a modified sample file; providing the modified sample file to the classification model to generate the classification; and returning the classification and the modified sample file in response to the request communication.

At block 640, operations of the method 600 may include adjusting the modification configuration based on the first modification model in response to receiving a classification from a classification model that identifies the modified sample file as being free of malware. In some embodiments, the classification may be similar to the classification result 130 described herein with respect to FIGS. 1 to 5C. In some embodiments, the classification model may be similar to the classification model 175 described herein with respect to FIGS. 1 to 5C.

In some embodiments, the modification to be performed on the sample file identified by the modification configuration is a first modification, and adjusting the modification configuration based on the first modification model in response to receiving the classification from the classification model that identifies the modified sample file as being free of malware includes altering the modification configuration to identify a second modification to be performed on the sample file, wherein the second modification is a variation of the first modification. In some embodiments, the variation of the first modification is a combination of the first modification with a third modification or a mutation of the first modification. In some embodiments, the variation of the first modification is selected based on the classification from the classification model.

In some embodiments, the method 600 further includes retraining the classification model using the modified sample file.

FIG. 7 is a component diagram of an example of a device architecture 700 for malware detection, in accordance with embodiments of the disclosure. The device architecture 700 includes computing device 710 having processing device 122 and memory 124, as described herein with respect to FIGS. 1 to 6.

Referring to FIG. 7, the computing device 710 may select a sample file 762 that is associated with malware and a first modification model 796 of a plurality of modification models to alter the sample file 762. In some embodiments, the sample file 762 may be similar to the training sample 162 described herein with respect to FIGS. 1 to 6. In some embodiments, the first modification model 796 may be similar to one of the modification models 196 described herein with respect to FIGS. 1 to 6. In some embodiments, the first modification model 796 is one or more of a heuristic learning model, a reinforcement learning model, or a genetic programming model.

The first modification model of the computing device 710 may generate a modification configuration 795 based on the sample file 762. The modification configuration 795 may identify a modification to be performed on the sample file 762. In some embodiments, the modification configuration 795 may be similar to the attack configuration 195 described herein with respect to FIGS. 1 to 6.

The computing device 710 may provide the sample file 762 and the modification configuration 795 to a modification engine 725 to generate a modified sample file 792. In some embodiments, the modification engine 725 may be similar to the modification engine 125 described herein with respect to FIGS. 1 to 6. In some embodiments, the modified sample file 792 may be similar to the modified sample file(s) 132 and/or the assessment sample file(s) 192 described herein with respect to FIGS. 1 to 6.

The computing device 710 may adjust (e.g., utilizing the processing device 122) the modification configuration 795 based on the first modification model 796 in response to receiving a classification 730 from a classification model 775 that identifies the modified sample file 792 as being free of malware. In some embodiments, the classification 730 may be similar to the classification result 130 described herein with respect to FIGS. 1 to 6. In some embodiments, the classification model 775 may be similar to the classification model 175 described herein with respect to FIGS. 1 to 6.

The device architecture 700 of FIG. 7 provides an improved capability for malware detection. The device architecture 700 allows for the creation of an improved classification model, which may lead to an improved capability to identify modifications to malware that might otherwise go undetected. By detecting modifications to sample files that evade malware detection, the device architecture 700 may be able to train modification models 796 to generate modification configurations 795 that may be utilized to improve the training of the classification model 775, as described herein. In some embodiments, the modification model 796 may be an ML-based model that can iteratively learn the types of modifications that are most successful at evading detection. In some embodiments, the modification model 796 may be able to perform different types of modifications, and thus different types of modification learning, for different types of sample files 762. The device architecture 700 provides a technological improvement to the operation of typical computing devices in that it is able to generate malware classifications models 775 that may identify malware more efficiently and may be resilient to the types of variations and obfuscations that are increasingly used to disguise malware.

Figure 8:
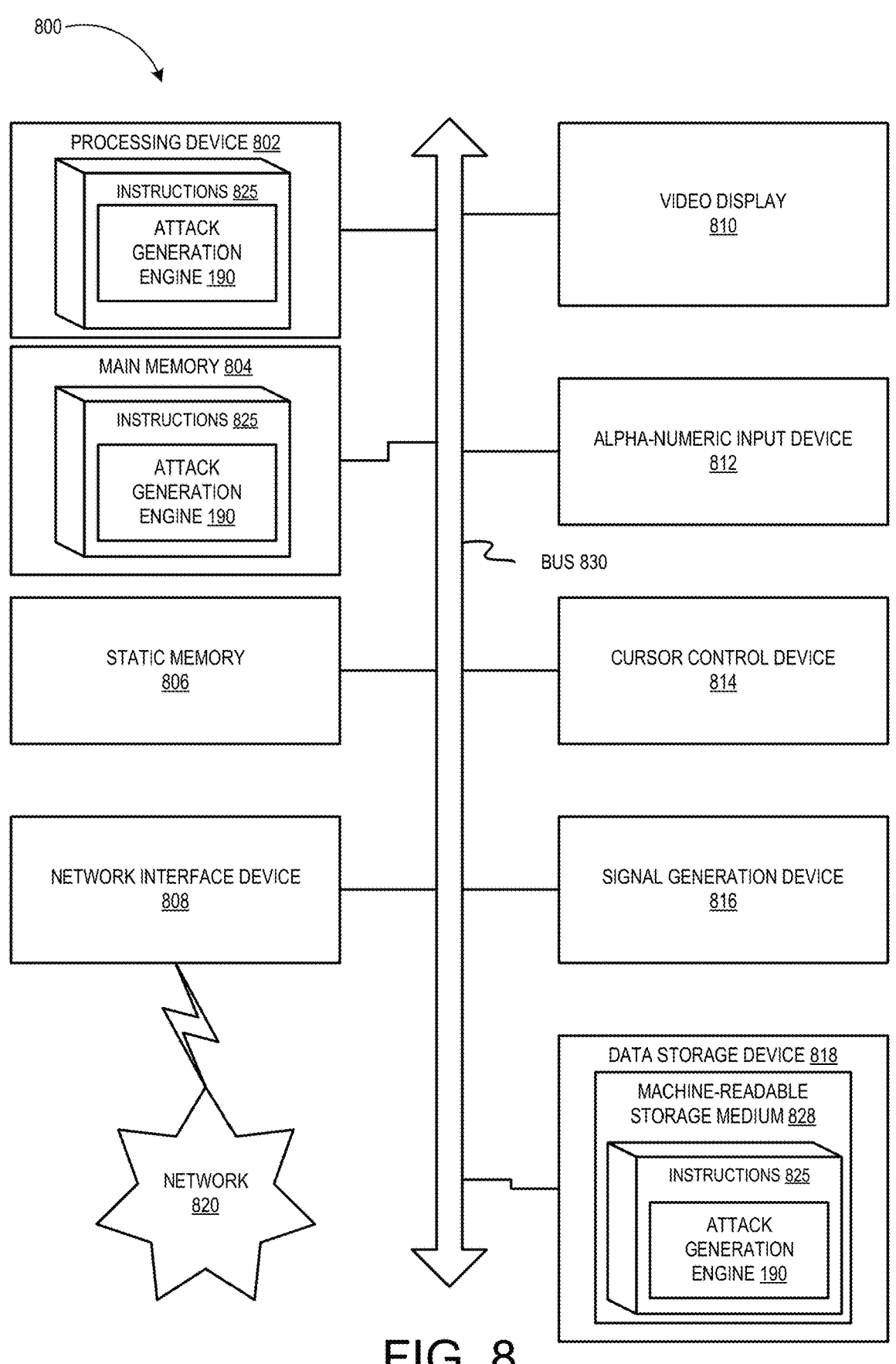
FIG. 8 is a block diagram of an example computing device that may perform one or more of the operations described herein, in accordance with embodiments of the disclosure.

FIG. 8 is a block diagram of an example computing device 800 that may perform one or more of the operations described herein, in accordance with some embodiments of the disclosure. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory) and a data storage device 818, which may communicate with each other via a bus 830.

Processing device 802 may be provided by one or more general-purpose processing devices such as a microprocessor, central processing unit, or the like. In an illustrative example, processing device 802 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also include one or more special-purpose processing devices such as an application specific integrated circuit (ASIC), a field programmable gate array (FPGA), a digital signal processor (DSP), network processor, or the like. The processing device 802 may execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions 825 that may include instructions for attack generation engine 190 and/or a training engine 180 for carrying out the operations described herein, in accordance with one or more aspects of the present disclosure. Instructions 825 may also reside, completely or at least partially, within main memory 804 and/or within processing device 802 during execution thereof by computing device 800, main memory 804 and processing device 802 also constituting computer-readable media. The instructions 825 may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "selecting," "generating," "providing," "adjusting," "retraining," "altering," "receiving," "modifying," "returning," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited for the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of detecting malware, the method comprising:

selecting a sample file that is associated with malware and a first modification model of a plurality of modification models to alter the sample file;

generating, by the first modification model, a modification configuration based on the sample file, wherein the modification configuration identifies a modification to be performed on the sample file;

providing the sample file and the modification configuration to a modification engine to generate a modified sample file;

providing the modified sample file to a classification model to generate a classification;

adjusting, by a processing device, the modification configuration based on the classification to produce an adjusted modification configuration; and generating at least one additional modified sample file based on the adjusted modification configuration.

2. The method of claim 1, wherein the first modification model is one or more of a heuristic learning model, a reinforcement learning model, or a genetic programming model.

3. The method of claim 1, further comprising:

retraining the classification model using the modified sample file.

4. The method of claim 1, wherein the modification to be performed on the sample file identified by the modification configuration is a first modification; and the adjusted modification configuration comprises a second modification to be performed on the sample file, wherein the second modification is a variation of the first modification.

5. The method of claim 4, wherein the variation of the first modification is a combination of the first modification with a third modification or a mutation of the first modification.

6. The method of claim 4, wherein the variation of the first modification is selected based on the classification from the classification model.

7. The method of claim 1, wherein the modification engine is to perform operations comprising:

receiving the sample file and the modification as part of a request communication;

modifying the sample file based on the modification configuration to generate the modified sample file;

providing the modified sample file to the classification model to generate the classification; and returning the classification and the modified sample file in response to the request communication.

8. A system comprising:

a memory; and a processing device, operatively coupled to the memory, to:

select a sample file that is associated with malware and a first modification model of a plurality of modification models to alter the sample file;

generate, by the first modification model, a modification configuration based on the sample file, wherein the modification configuration identifies a modification to be performed on the sample file;

provide the sample file and the modification configuration to a modification engine to generate a modified sample file;

provide the modified sample file to a classification model to generate a classification;

adjust the modification configuration generated by the first modification model based on the classification to produce an adjusted modification configuration; and generate at least one additional modified sample file based on the adjusted modification configuration.

9. The system of claim 8, wherein the first modification model is one or more of a heuristic learning model, a reinforcement learning model, or a genetic programming model.

10. The system of claim 8, wherein the processing device is further to:

retrain the classification model using the modified sample file.

11. The system of claim 8, wherein the modification to be performed on the sample file identified by the modification configuration is a first modification; and the adjusted modification configuration comprises a second modification to be performed on the sample file, wherein the second modification is a variation of the first modification.

12. The system of claim 11, wherein the variation of the first modification is a combination of the first modification with a third modification or a mutation of the first modification.

13. The system of claim 11, wherein the variation of the first modification is selected based on the classification from the classification model.

14. The system of claim 8, wherein the modification engine is to:

receive the sample file and the modification as part of a request communication;

modify the sample file based on the modification configuration to generate the modified sample file;

provide the modified sample file to the classification model to generate the classification; and return the classification and the modified sample file in response to the request communication.

15. A non-transitory computer-readable storage medium including instructions that, when executed by a processing device, cause the processing device to:

select a sample file that is associated with malware and a first modification model of a plurality of modification models to alter the sample file;

generate, by the first modification model, a modification configuration based on the sample file, wherein the modification configuration identifies a modification to be performed on the sample file;

provide the sample file and the modification configuration to a modification engine to generate a modified sample file;

provide the modified sample file to a classification model to generate a classification;

adjust, by the processing device, the modification configuration based on the classification to produce an adjusted modification configuration; and generate at least one additional modified sample file based on the adjusted modification configuration.

16. The non-transitory computer-readable storage medium of claim 15, wherein the first modification model is one or more of a heuristic learning model, a reinforcement learning model, or a genetic programming model.

17. The non-transitory computer-readable storage medium of claim 15, wherein the processing device is further to:

retrain the classification model using the modified sample file.

18. The non-transitory computer-readable storage medium of claim 15, wherein the modification to be performed on the sample file identified by the modification configuration is a first modification; and the adjusted modification configuration comprises a second modification to be performed on the sample file, wherein the second modification is a variation of the first modification.

19. The non-transitory computer-readable storage medium of claim 18, wherein the variation of the first modification is a combination of the first modification with a third modification or a mutation of the first modification.

20. The non-transitory computer-readable storage medium of claim 18, wherein the variation of the first modification is selected based on the classification from the classification model.

\* \* \* \* \*